United States Patent
Schmitz et al.

(10) Patent No.: US 12,083,731 B2
(45) Date of Patent: *Sep. 10, 2024

(54) METHOD FOR CONTROLLING A NOZZLE SLOT OF A DISCHARGE NOZZLE FOR A FILM TRACK OF A FLAT FILM MACHINE

(71) Applicant: Windmöller & Hölscher KG, Lengerich (DE)

(72) Inventors: Torsten Schmitz, Lengerich (DE); Waldemar Colell, Lengerich (DE); Bernd-Alexander Groepper, Lengerich (DE)

(73) Assignee: Windmöller & Hölscher KG, Lengerich (DE)

( * ) Notice: Subject to any disclaimer, the term of this patent is extended or adjusted under 35 U.S.C. 154(b) by 134 days.

This patent is subject to a terminal disclaimer.

(21) Appl. No.: 17/287,273

(22) PCT Filed: Nov. 5, 2019

(86) PCT No.: PCT/EP2019/080254
§ 371 (c)(1),
(2) Date: Apr. 21, 2021

(87) PCT Pub. No.: WO2020/094647
PCT Pub. Date: May 14, 2020

(65) Prior Publication Data
US 2021/0394419 A1    Dec. 23, 2021

(30) Foreign Application Priority Data
Nov. 6, 2018   (DE) .................... 10 2018 127 673.7

(51) Int. Cl.
*B29C 48/92*   (2019.01)
*B29C 48/08*   (2019.01)
(Continued)

(52) U.S. Cl.
CPC .............. *B29C 48/92* (2019.02); *B29C 48/08* (2019.02); *B29C 48/10* (2019.02); *B29C 48/31* (2019.02);
(Continued)

(58) Field of Classification Search
None
See application file for complete search history.

(56) References Cited

U.S. PATENT DOCUMENTS

| | | |
|---|---|---|
| 3,761,553 A | 9/1973 | Richardson |
| 3,940,221 A | 2/1976 | Nissel |

(Continued)

FOREIGN PATENT DOCUMENTS

| | | |
|---|---|---|
| AT | A161389 A | 12/1990 |
| CH | 702058 A1 | 4/2011 |

(Continued)

OTHER PUBLICATIONS

Machine translation of JPH0885145A (Year: 1996).*
(Continued)

*Primary Examiner* — Robert J Grun
(74) *Attorney, Agent, or Firm* — Peter W. Schroen; Bret E. Field; Bozicevic, Field & Francis LLP

(57) ABSTRACT

The invention relates to a method for controlling a nozzle slot (112) of a discharge nozzle (110) for a film track (FB) of a flat film machine (100), comprising the following steps:
acquiring an actual profile (IP) of the nozzle slot (112), detecting a thickness profile (DP) of the film track (FB), comparing the detected thickness profile (DP) of the film track (FB) with a preset profile (VP),
determining a profile deviation (PA) as a result of the comparison, (Continued)

Figure 1:
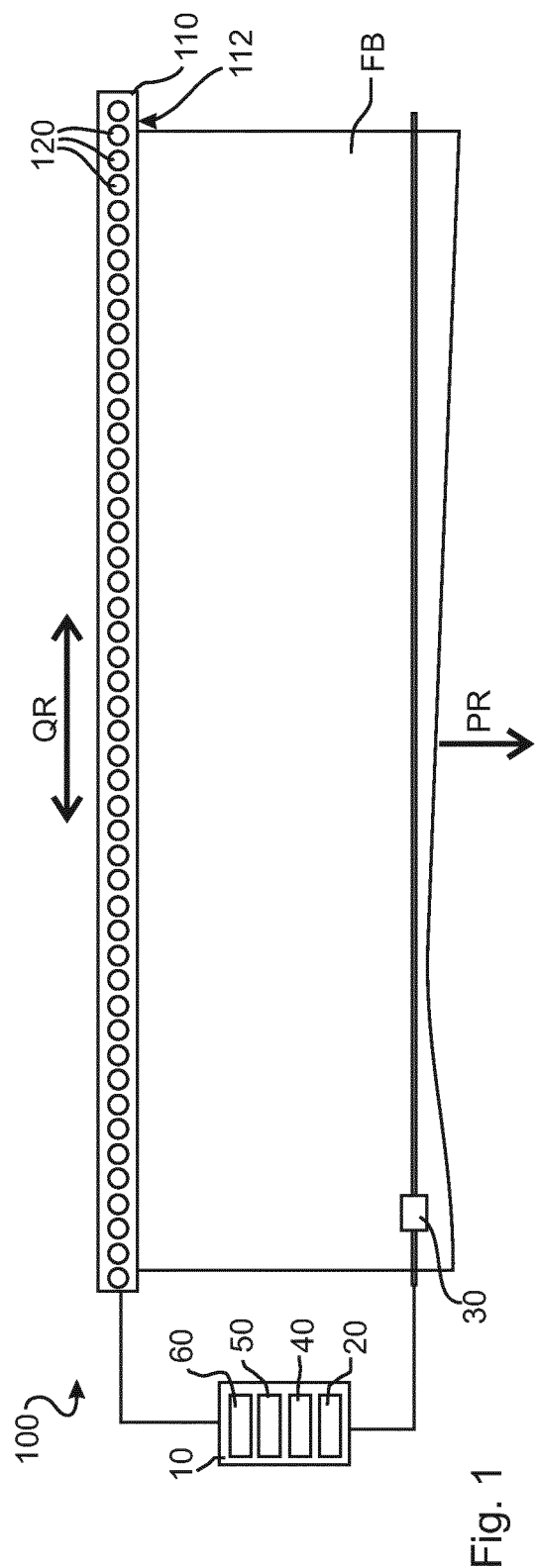

performing a controlling intervention to change the nozzle slot (112) based on the profile deviation (PA) and the actual profile (IP).

10 Claims, 6 Drawing Sheets

(51) Int. Cl.
*B29C 48/10* (2019.01)
*B29C 48/31* (2019.01)
*B29D 7/01* (2006.01)

(52) U.S. Cl.
CPC ...... *B29D 7/01* (2013.01); *B29C 2948/92647* (2019.02); *B29C 2948/92704* (2019.02)

(56) References Cited

U.S. PATENT DOCUMENTS

| | | | |
|---|---|---|---|
| 4,445,837 | A | 5/1984 | Cisar et al. |
| 4,454,082 | A | 6/1984 | Cisar et al. |
| 4,454,084 | A | 6/1984 | Smith et al. |
| 4,753,587 | A | 6/1988 | Djordjevic et al. |
| 4,804,557 | A | 2/1989 | Anthony, Jr. et al. |
| 4,931,982 | A | 6/1990 | Hayashida et al. |
| 5,208,047 | A | 5/1993 | Cloeren et al. |
| 5,587,184 | A | 12/1996 | Leonard et al. |
| 5,770,129 | A | 6/1998 | Monti |
| 6,799,961 | B1 | 10/2004 | Freynhofer et al. |
| 6,856,855 | B2 | 2/2005 | Hirata et al. |
| 9,579,684 | B2 | 2/2017 | Yapel et al. |
| 10,456,969 | B2 | 10/2019 | Pozgainer et al. |
| 10,843,397 | B2 | 11/2020 | Kaun et al. |
| 11,338,491 | B2 | 5/2022 | Lössl et al. |
| 11,738,494 | B2 | 8/2023 | Colell et al. |
| 2003/0050717 | A1 | 3/2003 | Hirata et al. |
| 2011/0006452 | A1 | 1/2011 | Bayer et al. |
| 2012/0315378 | A1 | 12/2012 | Yapel et al. |
| 2015/0115498 | A1 | 4/2015 | Pozgainer et al. |
| 2021/0237327 | A1 | 8/2021 | Colell et al. |

FOREIGN PATENT DOCUMENTS

| | | | |
|---|---|---|---|
| CN | 101365571 | A | 2/2009 |
| CN | 103747938 | A | 4/2014 |
| CN | 104552869 | A | 4/2015 |
| CN | 106584736 | A | 4/2017 |
| CN | 107175804 | A | 9/2017 |
| CN | 107175808 | A | 9/2017 |
| CN | 107379494 | A | 11/2017 |
| CN | 112118948 | A | 12/2020 |
| DE | 2229924 | A1 | 1/1973 |
| DE | 4020728 | A1 | 1/1991 |
| DE | 19855751 | A1 | 6/2000 |
| DE | 10117946 | A1 | 10/2002 |
| DE | 102016112121 | A1 | 1/2018 |
| EP | 1964659 | A1 | 9/2008 |
| EP | 2657000 | A1 | 10/2013 |
| EP | 2837484 | A1 | 2/2015 |
| EP | 2865511 | A1 | 4/2015 |
| JP | H1-232018 | A | 9/1989 |
| JP | H01-257023 | A | 10/1989 |
| JP | H08-85145 | A | 4/1996 |
| JP | H09309138 | A | 12/1997 |
| JP | 2000-94497 | A | 4/2000 |
| JP | 2001-30340 | A | 2/2001 |
| JP | 2003-89146 | A | 3/2003 |
| JP | 2004-122434 | A | 4/2004 |
| JP | 2016-179460 | A | 10/2016 |
| LU | 65607 | A1 | 10/1972 |
| WO | WO2007063927 | A1 | 6/2007 |
| WO | WO2012170713 | A1 | 12/2012 |

OTHER PUBLICATIONS

Office Action for German Application No. 102018127673.7 mailed Jul. 3, 2019, with its English translation, 6 pages.
International Preliminary Report on Patentability for PCT Application No. PCT/EP2019/080254 mailed May 11, 2021, 7 pages.
Office Action for Chinese Application No. 201980071150.2 Mailed Jul. 21, 2022, with its English summary, 10 pages.
Second Office Action for Chinese Application No. 201980071150.2 mailed on Feb. 11, 2023, with its English translation, 23 pages.
Office Action for German Application No. 10 2018 127 673.7 mailed on Nov. 26, 2022, with its English summary, 6 pages.
Bezigian, A Survey of Current Bead Reduction Die Technology, PLC Technologies Consulting Co., May 14, 1997, 12 pages.
Egan Davis-Standard Instruction Manual for Egan Series 50A Coating Die, Internally Deckled, Feb. 1999, 35 pages.
Operation Manual for the Black Clawson R.O.I. Die, Black Clawson Converting Machinery Corp., Jan. 16, 1998, 36 pages.
Vlachopoulos et al., Chapter 4: Flat Film and Sheet Dies, in: Design of Extrusion Forming Tools, pp. 113-140, Carneiro O.S. and Nobrega M. (eds.), Smithers Rapra, London, UK, 2012.
Third Office Action for Chinese Application No. 201980071150.2 mailed on Aug. 28, 2023, with its English translation, 39 pages.

* cited by examiner

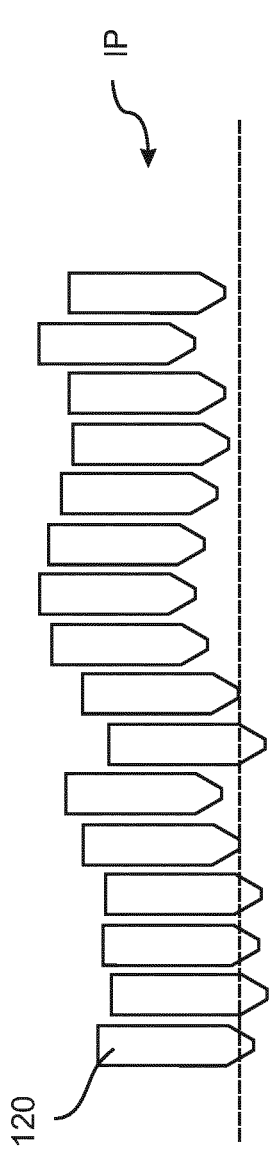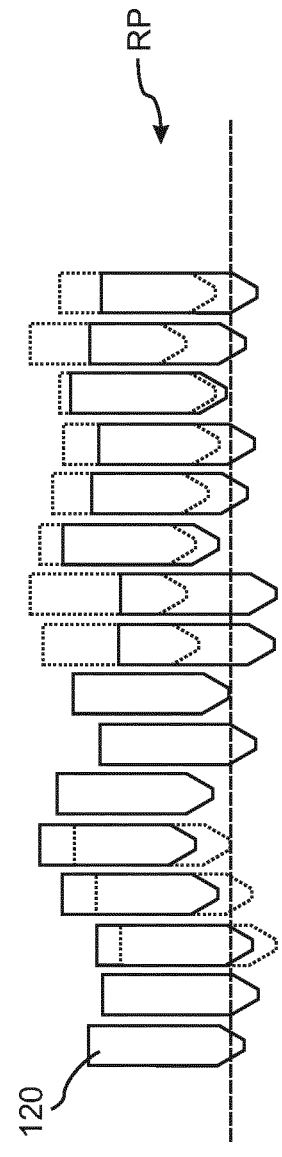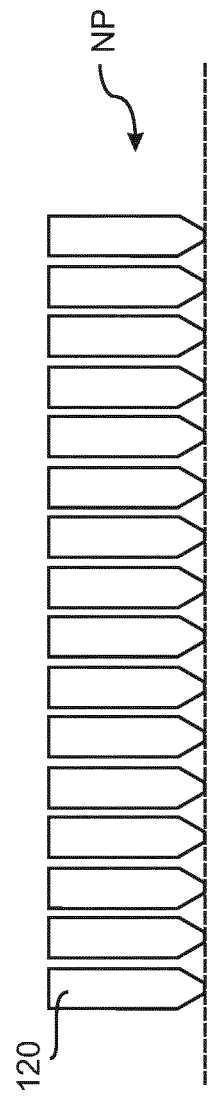

METHOD FOR CONTROLLING A NOZZLE SLOT OF A DISCHARGE NOZZLE FOR A FILM TRACK OF A FLAT FILM MACHINE

The present invention relates to a method for controlling a nozzle slot of a discharge nozzle for a film track of a flat film machine, and to a controlling device for carrying out such a method.

It is known that flat film machines are used to produce film products. Such film products comprise a variety of different material compositions and layer ratios. The individual layers can each comprise different material compositions, so that in total, depending on the material composition and layer composition, the film track as a film product can fulfill different functional properties and quality criteria. For production, a plurality of extrusion devices is provided to discharge a melt in the desired material composition with the desired layer distribution in a large width from a nozzle slot of a discharge nozzle. This material melt is then applied to a cooling roller and rotated off the latter, cooling the film track. The finished film track can then be conveyed by a roller system and wound up on a winding shaft. In addition, it is also possible to coat or laminate the melt. For example, one or more flat tracks can be fed to the melt for this purpose.

With the known solutions, it is often important to control or regulate the thickness profile of the film track. With regard to the quality of the film product, it is crucial that no excessive fluctuations occur in the thickness profile over time and over the location. In the case of localized thick spots, this would otherwise lead to these thick spots accumulating on the winding shaft during winding, resulting in so-called piston rings. Thin spots, i.e. regions in the thickness profile with too little material, can lead to defects in the film track as well as to holes or regions with reduced functionality.

In previous solutions, thickness regulation is used for this purpose. A thickness profile is monitored in the region of the net width of the film track in order to detect and compensate for deviations from a preset of a thickness profile in this section. Known regulation systems feature regulation loops that can act on adjusting means of the discharge nozzle. These adjusting means are, for example, so-called thermal bolts which, depending on the desired controlling intervention, can be acted upon by the regulation method with a temperature, a heating power, a heating time, a heating interval and/or a heating voltage, so that direct intervention on the geometric design of the nozzle slot of the discharge nozzle is possible by thermal expansion or by thermal contraction.

The disadvantage of the known solutions, however, is that they only involve a re-regulation of the individual adjusting means on the basis of a detected thickness profile. This re-regulation does not take into account the actual starting situation of the individual adjusting means or the actual starting situation of the actual profile of the nozzle slot. On the one hand, this has the disadvantage that if the starting point is unknown, the regulation is less likely to have the desired success, so that a larger number of regulation steps is often necessary to achieve a regulation effect. On the other hand, this can lead to the fact that transverse influences along the transverse direction at a point of the thickness profile have an undesirable and unpredictable effect at another point of the thickness profile in a local manner during the controlling intervention.

It is an object of the present invention to at least partially eliminate the disadvantages described above. In particular, it is an object of the present invention to improve the possibility of controlling the nozzle slot in a cost-effective and simple manner.

The existing object is solved by a method and a controlling device of the present disclosure. Further features and details of the invention result from the description and the figures. Features and details described in connection with the method according to the invention naturally also apply in connection with the controlling device according to the invention and vice versa in each case, so that reference is or can always be made mutually with regard to the disclosure concerning the individual aspects of the invention.

According to the invention, a method is used to control a nozzle slot of a discharge nozzle for a film track of a flat film machine. Such a method comprises the following steps:
  acquiring an actual profile of the nozzle slot,
  detecting a thickness profile of the film track,
  comparing the detected thickness profile of the film track with a preset profile,
  determining a profile deviation as a result of the comparison,
  performing a controlling intervention to change the nozzle slot based on the profile deviation and the actual profile.

A method according to the invention is therefore based on the fundamentally known solution of monitoring the thickness profile of the film track. For this purpose, the thickness profile of the film track is also detected in the method according to the invention. This detection can take place over the entire width along the transverse direction of the film track, but at least over partial sections of this transverse direction of the film track. On the basis of the thickness profile, a comparison can now be made with a corresponding preset profile. The preset profile can comprise threshold values, so that the preset profile can also be designed as a preset corridor with an upper and a lower threshold value. If the preset values are exceeded, for example upwards or downwards, the corresponding profile deviation can be defined as the result of the comparison. Thus, if at one point the thickness profile exceeds the corresponding preset profile, the profile deviation beyond this preset profile can be determined not only qualitatively, but also in a quantitative manner. As a final step, according to the invention, a controlling intervention is introduced in such a way that the nozzle slot is changed so that the undesirably large profile deviation can be compensated again. The aim of the controlling intervention is thus to control the thickness profile or to keep the thickness profile within a defined reference to a preset profile or within a predefined preset corridor.

In contrast to the known solutions, however, the controlling intervention with the aim of controlling the thickness profile in this way is now based on two different and separate input values. On the one hand, it is the profile deviation, which is qualitatively and/or quantitatively able to provide the direction and the expression of the controlling intervention. On the other hand, however, the actual profile is also included in the controlling intervention. The actual profile of the nozzle slot is thereby in the sense of the present invention in direct or indirect way a reproduction of the geometrical starting situation of the nozzle slot for the following controlling intervention. The actual profile also extends in the transverse direction, in particular over the entire width, of the discharge nozzle. Thus, depending on the setting of the individual adjusting means, a different thickness profile will form as the actual profile. The actual bulge and curvature at the individual local points of the upper nozzle lip are decisive for the relation to the thickness profile of the film track. Depending on how strongly a corresponding adjusting means acts mechanically from above on the nozzle lip above the nozzle slot, the counter-pressure of the melt within the nozzle slot will cause the nozzle lip to deform elastically. This happens not only with one adjusting means, but with all adjacent adjusting means over the entire width in the transverse direction in the flat film machine. The result is therefore an actual profile which is a force equilibrium in a complex manner from the counter-pressure situation of the material melt from below and the mechanical action of the plurality of adjusting means from above, also in transverse correlation. This is not taken into account at all in known solutions, but in a method according to the invention it can now have an additional influence on the controlling intervention.

As can be seen above, the actual profile is a complex geometric configuration, which is in particular an irregular configuration of the nozzle lip of the nozzle slot. Such a configuration can be local, for example as a local bending curve between the bolts, and/or global, for example as a bending up of the entire nozzle body under the internal melt pressure. It results not only from a single action relationship, but from a complex correlation of a plurality of mechanically adjacent actions of the adjusting means on the one hand and the correspondingly acting counter-forces of the melt on the underside of the nozzle lip on the other hand.

The fact that the profile deviation is not only taken into account qualitatively and/or quantitatively for the controlling intervention in accordance with the invention, but that the real starting situation in the form of the actual profile of the nozzle slot is also made available for the controlling intervention, means that the controlling intervention can be generated with improved results in a significantly improved manner. Thus, by knowing the starting point of the necessary controlling intervention in a method according to the invention, an improved intervention can be achieved not only qualitatively, but also quantitatively. For example, it is now possible to recognize where and with which relation an adjusting means provides a corresponding actual deformation in the actual profile of the nozzle slot. If, for example, at a point where a downward profile deviation, i.e. an undesirable thin spot of the film track, has been detected, there is also a closing point in the actual profile of the nozzle slot with a correspondingly thin outflow quantity of melt, a further downward adjustment of this adjusting means may possibly lead to an undesirable intensification of this thin spot. In such a case, the controlling intervention would thus, starting from this relatively strong closing position, possibly move this adjusting means qualitatively and quantitatively upwards along the profile deviation in order to be able to add more material from the side in this region of the undesired thin spot. If, however, given the same geometric situation in the thickness profile, this thin spot in the actual profile of the nozzle slot is a position at which the adjusting means and the associated nozzle slot are relatively wide open, further opening of the nozzle slot at this position will provide little or even no effect. In such a case, however, a conventional method without taking the actual profile into account would prefer precisely this adjusting process, so that the result would be no movement of the thickness profile or, in case of doubt, even an undesirable movement with a further reduction of this thin spot. Only by means of a method according to the invention is it now possible to provide a modified controlling intervention by means of this actual profile, which, for example, closes neighboring adjusting means further in order to move or press material melt into the already open adjusting means at the local profile deviation.

As can be seen from the above example, a different controlling intervention can now be generated for the same profile deviation, i.e. for the same regulation requirement of the thickness profile, wherein this differentiation is based on the starting situation of the nozzle slot, namely the real actual profile. This example also shows that the controlling intervention can now be carried out in a much more targeted and result-oriented manner according to the invention. Whereas with known solutions, controlling interventions could have less effect or even a contrary effect than expected due to the unknown starting situation, in the manner according to the invention, the controlling intervention can now lead to the desired controlling result more quickly, more simply and, above all, in a more targeted manner. As a result, the film track can not only be produced more stably, but the film quality can also be maintained with greater certainty or within narrower preset profile limits.

It can be advantageous if, in a method according to the invention, the effect of the controlling intervention is stored together with the actual profile as a result profile for use as an actual profile for a subsequent controlling intervention. In this way, it is possible that the actual profile leads to a result profile in the form of the controlling intervention so to say in a continuous extrapolation, and this result profile is made available again as an actual profile for the next run of the method according to the invention. The method is thus carried out in a cascading manner, with the result profile always replacing the previous actual profile. This is a particularly simple and cost-effective solution, since the method can be carried out continuously after a single calibration with a start/actual profile. For example, when setting up the machine, a first calibration profile can be measured mechanically and then made available to this continuous extrapolation process as the very first actual profile. Further calibration may be necessary or useful if, after a long period of operation of the flat film machine, the deviations between the actual profiles and the result profiles become greater. It is also possible to carry out the normalization step, explained later, in order to reduce or even minimize undesirable deviations caused by the continuous extrapolation.

It is a further advantage if, in a method according to the invention, the actual profile is at least partially acquired by a simulation of the nozzle slot. Such a simulation can, for example, acquire input parameters of the flat film machine and/or product parameters of the film track. This can be, for example, a mathematical simulation which is stored as a simulation model in a corresponding controlling device. By specifying basic mechanical values of the material of the nozzle slot and the correspondingly acting components of the adjusting bolts as well as the counter-forces from the material composition of the melt, a real nozzle slot or a corresponding actual profile can now be simulated. This simulation can of course also be verified or supplemented with corresponding force sensors. Thus, input parameters of the operation of the flat film machine, but also detection sensors arranged separately for this simulation can be used to provide a basis for such a simulative acquisition of the actual profile.

Further advantages are gained if, in a method according to the invention, a stretching ratio of the film track downstream of the discharge nozzle is additionally taken into account for the controlling intervention. Usually, the film track is pulled off the cooling roller faster than the corresponding material is discharged through the nozzle slot. As a result, the film track elongates or stretches in the production direction. This stretching or elongation is defined by the stretching ratio and is explicitly desired in order to produce different film properties, in particular different mechanical properties of the film track, by aligning the elongated polymerization molecules. Thus, this stretching ratio can be used as a basis or at least as a consideration possibility in the controlling intervention. At this point, it becomes apparent that a direct influence on the quality of the film track can be taken via the controlling intervention carried out according to the invention. Compared to the known manual interventions by the operator of the flat film machine, this takes place here automatically or semi-automatically with a correspondingly improved controlling effect.

A further advantage is, in a method according to the invention, when the stretching ratio is taken into account with regard to the stretching speed and/or the stretching acceleration. This provides an even more precise possibility of monitoring the product properties and the quality of the film track via the time offset of the stretching speed and the stretching acceleration. It is also possible not only to regulate or control product properties in this way, but also to record and track them for complete documentation.

It is also advantageous if, in a method according to the invention, the actual profile of the nozzle slot is at least partially acquired as an adjusting profile by adjusting means of the discharge nozzle. The adjusting profile thus permits indirect acquisition of the actual profile, since the adjusting profile of the adjusting means generates or causes the real actual profile of the nozzle slot. Thus, mathematical or other simulation means can also be considered here in order to take into account the thermal effect or the adjusting effect of the individual adjusting means. Thus, measurements on the geometry of the individual adjusting means or the measurement of the temperature of the bolts are conceivable in the sense of the present invention. Thus, in this way, a direct feedback of the actual profile and also of the result profile already discussed becomes possible. Of course, such direct influence or acquisition possibilities of the actual profile of the nozzle slot can also be combined with further acquisition possibilities of the real actual profile of the nozzle slot.

There are further advantages if, in a method according to the invention, the actual profile of the nozzle slot is at least partially acquired as an average value. This makes it possible to reduce fine fluctuation widths or small changes on the surface of the nozzle slot and to significantly reduce the necessary computational effort. In this way, the average value or the fluctuating average value can provide a basis for the controlling intervention, which can now be provided with the help of reduced computational effort and thus also reduced speed.

It is also advantageous if, in a method according to the invention, the chronological development of the actual profile is at least partially stored. On the one hand, this allows the actual profile to always be available over the course of the method according to the invention and to be used for subsequent regulation and controlling interventions. In this way, a so-called feedback can also be made available for future controlling interventions, so that it is possible to refer to known result profiles with reference to the controlling interventions carried out for this purpose. The construction of a corresponding database allows the method to be designed as a learning system. In this way, feedback can also be provided for the design of future flat film machines, so that the discharge nozzle or its rheological distribution of the melt and the nozzle slot or the flow channel in front of the nozzle slot can be designed in a correspondingly better, more stable or mechanically different way in the future.

There are further advantages if, in a method according to the invention, the controlling intervention additionally takes into account at least one product parameter of the film track. Such a product parameter can, for example, be read in from a database. It can be, for example, the material composition, a layer ratio or the layer thickness ratios of the individual layers to each other. Production parameters of the flat film machine can also be used here additionally or alternatively.

It can also be advantageous if, in a method according to the invention, a normalization step is carried out, in particular as a normalized controlling intervention. This is carried out in particular as an intermediate step when calibration becomes necessary again for increasing the accuracy of the acquisition of the actual profile. For example, such a normalization step can additionally be carried out during the changing from a feed product to a follow-on product, since it cannot influence a final product to be sold during this period. For example, the normalization step can acquire a digital normalization, so that in the digital evaluation the adjusting values of the individual adjusting means are normalized, i.e. set to zero, for example. However, the normalization step can also mean a real adjustment of the adjusting means to a common zero value. This can mean that the normalization provides that all adjusting means are driven to a same zero value. However, a normalization specification with different adjusting quantities of the individual adjusting means can also provide such a normalization position specifically for each individual adjusting means.

Another object of the present invention is a controlling device for controlling a nozzle slot of a discharge nozzle for a film track of a flat film machine. Such a controlling device comprises an acquisition module for acquiring an actual profile of the nozzle slot. Furthermore, a detection module is provided for detecting a thickness profile of the film track. Furthermore, the controlling device is equipped with a comparison module for comparing the detected thickness profile of the film track with a preset profile. By means of a determination module, a determination of a profile deviation as a result of the comparison is possible. An intervention module can be used to perform a controlling intervention to change the nozzle slot based on the profile deviation of the actual profile. The acquisition module, the detection module, the comparison module, the determination module and/or the intervention module are preferably designed for carrying out a method according to the invention. Thus, a controlling device according to the invention has the same advantages as have been explained in detail with reference to a method according to the invention.

Figure 2:
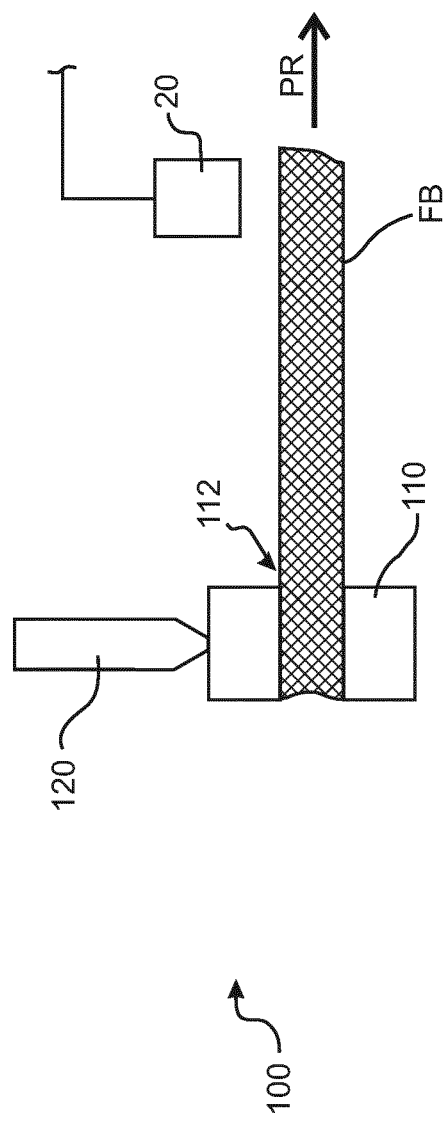
Figure 3:
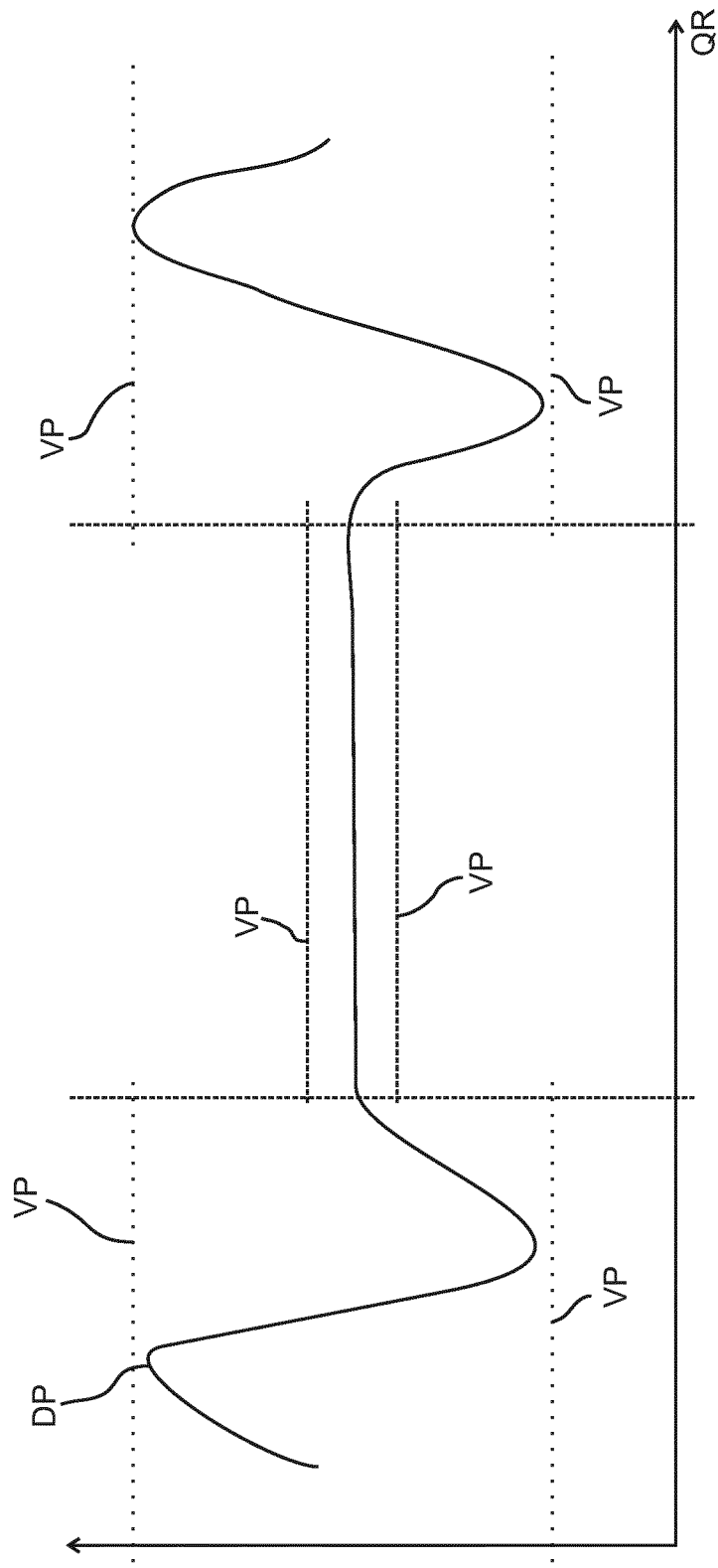
Figure 4:
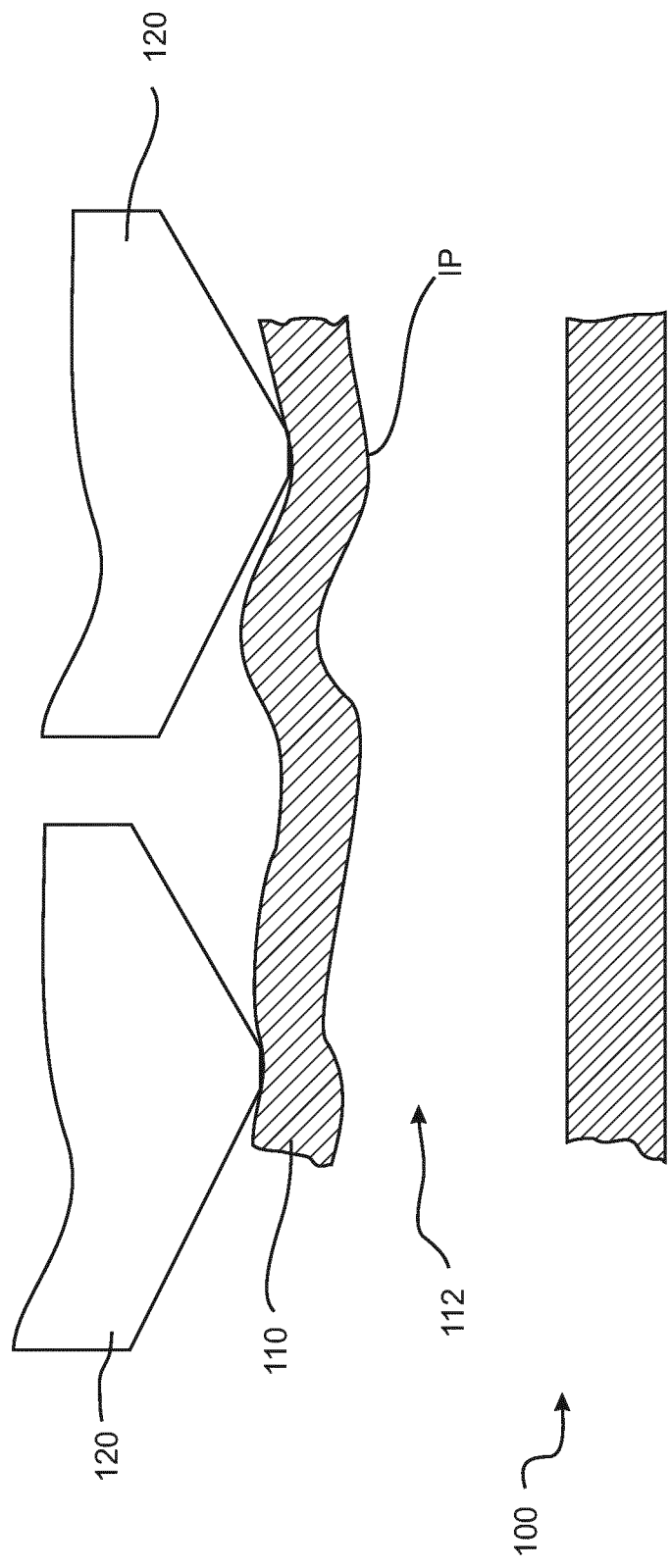
Figure 5:
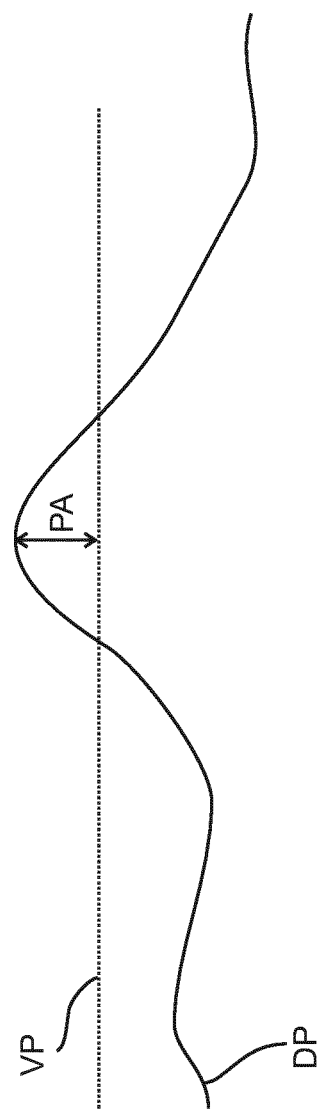
Figure 9:
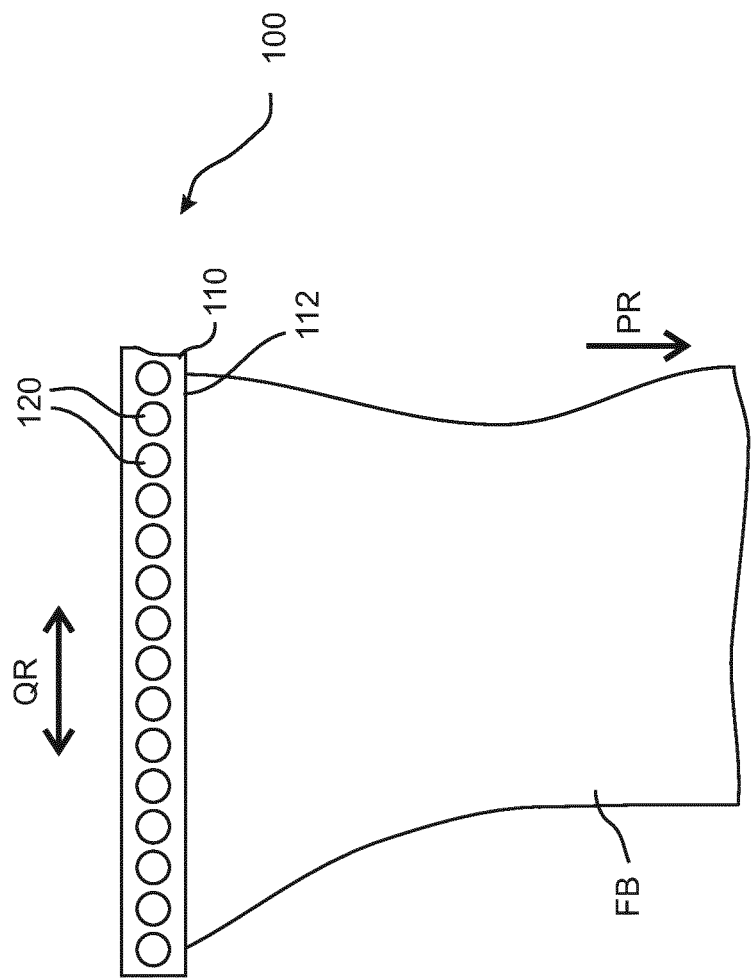

Further advantages, features and details of the invention will be apparent from the following description, in which embodiments of the invention are described in detail with reference to the figures. Thereby, the features mentioned in the claims and in the description may each be essential to the invention individually or in any combination. The figures schematically show:

FIG. 1 an embodiment of a controlling device according to the invention on a flat film machine, FIG. 2 the embodiment of FIG. 1 in a schematic cross-section, FIG. 3 a representation of a possible thickness profile, FIG. 4 a representation of a possible actual profile of the nozzle slot, FIG. 5 a representation of a profile deviation on a thickness profile, FIG. 6 one possibility of an adjusting profile in the actual profile, FIG. 7 the embodiment of FIG. 6 as a result profile, FIG. 8 the embodiment of FIGS. 6 and 7 with a normalizing profile and FIG. 9 a representation in top view for a stretching ratio of the film track.

FIGS. 1 and 2 schematically show a flat film machine 100, which is equipped with a plurality of adjusting means 120 along the transverse direction QR. These adjusting means 120 may, for example, be thermal bolts. These allow a nozzle lip of a discharge nozzle 110 to be acted upon mechanically in order to be able to vary the discharge thickness at a nozzle slot 112 accordingly. Material melt in the form of a film track FB is discharged along the production direction PR via this nozzle slot 112.

With the aid of a detection module 30, a controlling device 10 is able to record a thickness profile DP locally or over the entire transverse direction QR for the film track FB. The detection module 30 can also be mounted movably in order to be able to record the thickness profile DP over as large a region of the film track FB as possible via a transverse displacement along the transverse direction QR. The acquired thickness profile DP can actually be acquired and further processed via the detection module 30.

By means of the acquisition module 20, it is possible to directly or indirectly acquire the actual profile of the nozzle slot. This can be a separate sensor mechanism spaced from the adjusting means 120, but also arranged on them. An acquisition module 30 can be used to acquire the thickness profile DP. Thus, it is possible to acquire two input values in the form of the actual profile IP and in the form of the thickness profile DP. Via a comparison module 40 and a determination module 50, comparisons with a preset profile VP can now lead to the profile deviation PA. Based on this profile deviation PA and with the aid of the actual profile IP, an intervention module 60 can now provide appropriate controlling interventions for the adjusting means 120. FIG. 2 shows a possible cross-section, which well represents the nozzle slot 112 with its thickness adjustment by the adjusting means 120.

FIG. 3 shows schematically how such a thickness profile DP can be designed in the transverse direction QR. Two edge sections are provided here with relatively large deviations and correspondingly relatively wide preset profiles VP. Decisive for the produced film track FB to be provided with high quality is the central so-called net region, which is provided with correspondingly narrow presets as preset profiles VP. A corresponding deviation is shown in detail, for example in FIG. 5. There, a thickness profile DP is found which exceeds a preset profile VP at one point. This is therefore a thick spot where the film track FP is too thick, which is reflected here by an increased profile deviation PA. This profile deviation PA can now be used qualitatively and quantitatively as the basis for the controlling intervention within the controlling device 10.

FIG. 4 shows how mechanical action by the adjusting means 120 and corresponding mechanical counter-pressure of the melt from the nozzle slot 112 results in a complex geometric elastic deformation of the discharge nozzle 110 as the actual profile IP. In this case, the individual forces cause a transverse correlation, i.e. the two adjusting means 120 influence each other side by side in the same way as the counter-forces in the melt distribution can influence each other transversely. The result is a very complex actual profile IP, as shown schematically in FIG. 4. In addition to the illustrated local changes of the actual profile IP, a global change is also conceivable.

While according to FIG. 4 such an actual profile IP is directly acquirable by measurement, simulation or other means, indirect possibilities can also provide the actual profile IP to a method according to the invention. FIGS. 6, 7 and 8 show here the possibility of using an adjusting profile SP of the adjusting means 120. For this purpose, position sensors, thermal sensors, but also the feedback of the controlling interventions can be used in an indirect way. FIG. 6 shows an actual profile IP, which is formed around a center line as an average value. The individual adjusting means 120 can now be assigned a controlling intervention based on this actual profile and based on a detected profile deviation PA, for example as shown in FIG. 5. This controlling intervention results in a movement for each or at least some of the adjusting means 21 as shown in their final position in FIG. 7. Thus, this is the result profile RP, which represents the result of the controlling intervention. This result profile RP can now be used as the actual profile IP for the next run of a controlling intervention according to a method according to the invention.

FIG. 8 now shows that after a plurality of runs of the method according to the invention, potentially potentiating sources of error can occur. For example, it is now possible to bring all the adjusting means 120 into a normalizing position according to the normalizing profile NP either on a digital basis or on a real basis in a normalizing step. Based on this normalization profile NP, this profile itself can only be used as the actual profile IP for the next run of the method according to the invention.

FIG. 9 also shows that the stretching ratio can also be relevant for the method according to the invention. It is thus possible that a so-called neck-in occurs, i.e. the film width of the film track FP decreases in the direction of the production direction PR and in relation to the transverse direction QR, if the film track FB is drawn off from the cooling roller at a correspondingly higher speed.

The foregoing explanation of the embodiments describes the present invention exclusively in the context of examples. Of course, individual features of the embodiments can be freely combined with each other, provided that this is technically reasonable, without leaving the scope of the present invention.

LIST OF REFERENCE SIGNS 10 controlling device
20 acquisition module
30 detection module
40 comparison module
50 determination module
60 intervention module
100 flat film machine
110 discharge nozzle
112 nozzle slot
120 adjusting means
FB film track
IP actual profile
RP result Profile
NP normalizing profile
SP adjusting profile
DP thickness profile
VP preset profile
PA profile deviation
QR transverse direction
PR production direction

The invention claimed is:

1. A method for controlling a nozzle slot of a discharge nozzle for a film track of a flat film machine, comprising the following steps, performed repeatedly during production of the film track:
   acquiring an actual profile of the nozzle slot,
   detecting a thickness profile of the film track,
   comparing the detected thickness profile of the film track with a preset profile,
   determining a profile deviation as a result of the comparison, and
   performing a controlling intervention to change the nozzle slot based on the profile deviation and the actual profile, wherein an effect of the controlling intervention is stored together with the actual profile as a result profile for use as an actual profile for a subsequent controlling intervention.

2. The method according to claim 1, wherein the actual profile is at least partially acquired by a simulation of the nozzle slot.

3. The method according to claim 1, wherein a stretching ratio of the film track downstream of the discharge nozzle is additionally taken into account for the controlling intervention.

4. The method according to claim 3, wherein the stretching ratio is taken into account with regard to at least a stretching speed or a stretching acceleration.

5. The method according to claim 1, wherein the actual profile of the nozzle slot is at least partially acquired as an adjusting profile by adjusting means of the discharge nozzle.

6. The method according to claim 1, wherein the actual profile of the nozzle slot is at least partially acquired as an average value.

7. The method according to claim 1, wherein the chronological development of the actual profile is at least partially stored.

8. The method according to claim 1, wherein the controlling intervention additionally takes into account at least one product parameter of the film track.

9. The method according to claim 1, wherein a normalization step is carried out.

10. The method according to claim 1, wherein a normalization step is carried out as a normalizing controlling intervention.

* * * * *